United States Patent
Vehmas

(12) 
(10) Patent No.: US 6,279,350 B1
(45) Date of Patent: Aug. 28, 2001

(54) ADJUSTING COOLING AIR IN GLASS TEMPERING MACHINE

(75) Inventor: Jukka Vehmas, Tampere (FI)

(73) Assignee: Uniglass Engineering OY, Tampere (FI)

( * ) Notice: Subject to any disclaimer, the term of this patent is extended or adjusted under 35 U.S.C. 154(b) by 0 days.

(21) Appl. No.: 09/194,194

(22) PCT Filed: May 21, 1997

(86) PCT No.: PCT/FI97/00301

§ 371 Date: Jun. 2, 1999

§ 102(e) Date: Jun. 2, 1999

(87) PCT Pub. No.: WO97/44285

PCT Pub. Date: Nov. 27, 1997

(30) Foreign Application Priority Data

May 22, 1996 (FI) .................................................. 962160

(51) Int. Cl.[7] .................................................. C03B 27/044
(52) U.S. Cl. .................................. 65/114; 65/161; 65/348
(58) Field of Search .................................. 65/29.15, 104, 65/114, 161, 348

(56) References Cited

U.S. PATENT DOCUMENTS

| | | | |
|---|---|---|---|
| 2,188,401 | * | 1/1940 | Crowley ................................. 65/161 |
| 4,874,418 | * | 10/1989 | Kuster et al. ........................... 65/348 |
| 5,236,488 | * | 8/1993 | Vehmas .................................. 65/114 |
| 5,368,624 | * | 11/1994 | Lehto et al. ........................ 65/29.19 |
| 5,951,734 | * | 9/1999 | Friedel et al. ........................... 65/118 |

FOREIGN PATENT DOCUMENTS 0282947  9/1988 (EP) .
  77216  9/1988 (FI) .

* cited by examiner

*Primary Examiner*—Sean Vincent
(74) *Attorney, Agent, or Firm*—Ladas and Parry

(57) ABSTRACT

A method and an equipment for adjusting the cooling air of a glass tempering machine. Cooling air is led by at least one fan (1, 2) to a tempering area (4) for cooling the glass exiting a tempering furnace (11). By means of a closing device (10) the tempering area (4) can be reduced such that a tempering zone with a pressure that can be raised sufficiently high for tempering thin glass can be formed out of the reduced tempering area. In this manner the tempering result becomes very even, and no separate tempering zone is needed even for thin glass.

8 Claims, 4 Drawing Sheets

ADJUSTING COOLING AIR IN GLASS TEMPERING MACHINE

Figure 1:
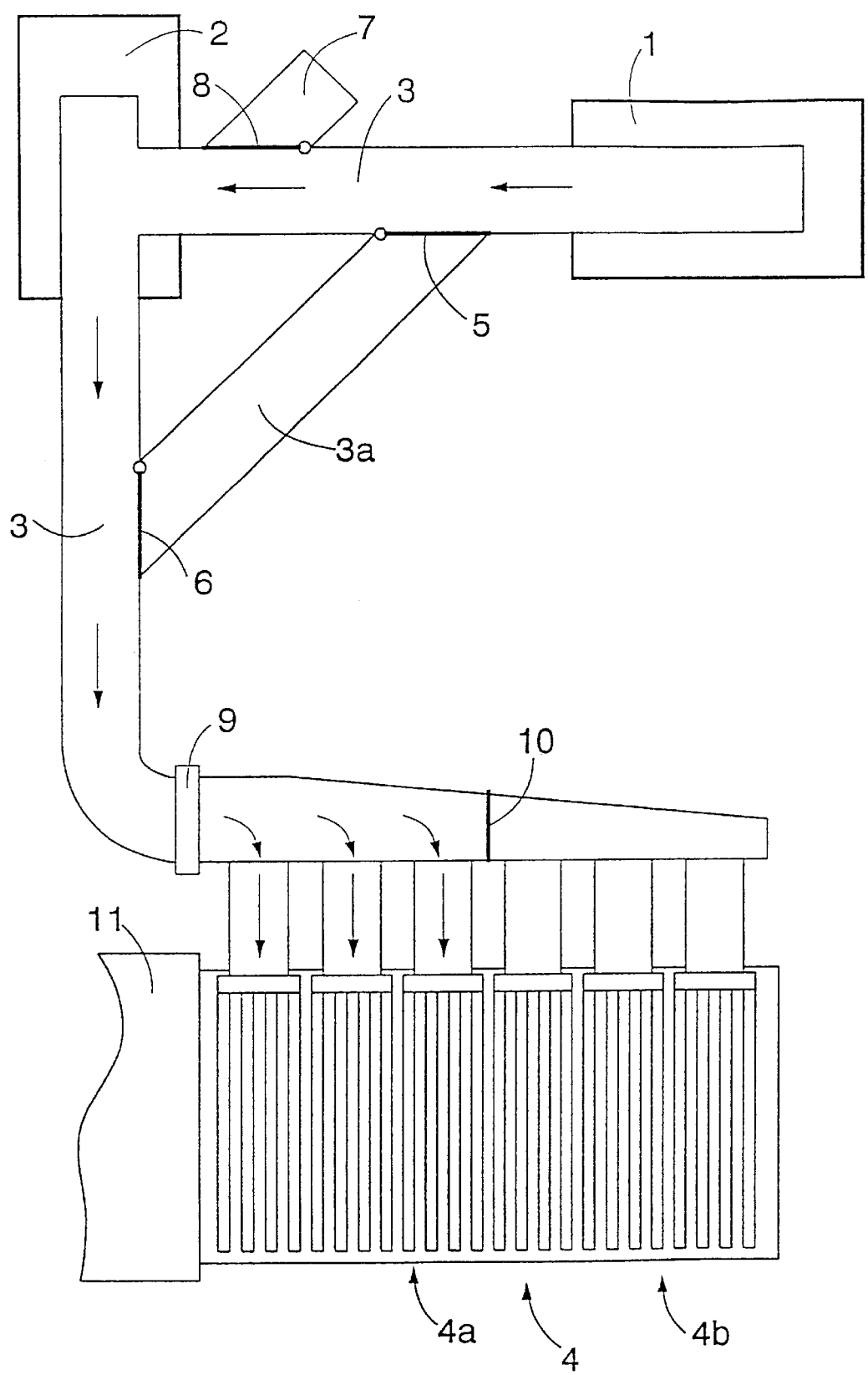

The invention relates to a method of adjusting the cooling air of a glass tempering machine, in which method cooling air is led to a tempering area for cooling the glass exiting a tempering furnace.

The invention also relates to an equipment for adjusting the cooling air of a glass tempering machine, the equipment comprising at least one fan and a channel system for leading cooling air to a tempering area for cooling the glass exiting a tempering furnace.

When tempering glass, the temperature of the glass is increased above the softening point of glass in the tempering process. For this purpose tempering furnaces are used, currently typically what are known as oscillating roller furnaces. After the tempering furnace the glass is led to temper cooling. Tempering thin glasses, typically with a thickness of 2.8 to 3.8 mm, requires a high tempering pressure provided by a fan, e.g. a pressure of about 20 to 25 kPa. The alternative is to use the combined effect of fan air and compressor air, whereby an about 8 to 10 kPa tempering pressure is sufficient with the tempering effect practically emanating from the compressor. Thin glasses are tempered either in a separate tempering zone through which the glasses are conveyed without stops. After the tempering zone, the glasses are led to an after cooling unit where they are oscillated in a reciprocating manner upon rollers. The blast pressure of the tempering zone is provided e.g. by series connected high-pressure fans. Such a separate tempering zone involves expensive equipment and structural investments. Furthermore, said tempering zone cannot be utilized in connection with glasses with a thickness of 4 mm or more, the after cooling unit operating as their tempering unit. Tempering thin glasses may be implemented also without a separate tempering zone by blowing pressurized air at the glasses both by fans and by the compressor. This, however makes the anisotropy pattern of the glass quite uneven as the air jets are formed spotlike. Furthermore, a separate compressor is needed, and, in order to increase the capacity, the compressor should be expanded with increased capacity.

On the other hand, when tempering thick glasses, the blast pressure has to be sufficiently low. Typically this problem is solved by adjusting the speed of rotation of the fan motors. Fl 77,216 discloses an alternative way to achieve low blast pressure. Said publication describes a solution with at least two fans, fan channels between the fans and the air delivery chamber, and a bypass channel connecting the fan channels. A gate valve is disposed after the bypass channel 7 between the fan channel and the air delivery chamber, the plate being in throttle position when one fan is switched on with the guide vane control closed and another fan is switched off with the guide vane control partially or entirely open. The air is led by the bypass channel 7 to the channel of the other fan, from where it exits via the open guide vane control. This way, the gate valve being in its maximum throttle position, the desired minimum pressure is achieved for the nozzles. Said solution and adjusting the speed of rotation of the fan motors require, however, a completely separate solution in tempering thin glasses.

It is the object of the present invention to provide a method and an equipment for avoiding the above mentioned drawbacks and for implementing temper cooling simply within a wide range of glass thickness.

The method of the invention is characterized in that the tempering area is reduced by closing a closing device that can be opened and closed, whereby a tempering zone with a pressure that can be raised sufficiently high for tempering thin glass can be formed out of the reduced tempering area.

The blast pressure unit of the invention is characterized in that it comprises a closing device for directing blast air at only a part of the tempering area, whereby a tempering zone with a pressure that can be raised sufficiently high for tempering thin glass can be formed out of the reduced tempering area.

It is an essential idea of the invention that the tempering area can be reduced by a closing device, whereby a tempering zone with a pressure that can be raised sufficiently high for tempering thin glass can be formed out of the reduced tempering area. Furthermore, the closing device can be opened for the after cooling of thin glasses or the tempering of thicker glasses, for example. It is the idea of still another preferred embodiment that the tempering area is reduced to a tempering zone of half the size of the tempering area. It is the idea of another preferred embodiment that the equipment comprises at least two fans which can be connected both in series and in parallel by means of channel systems and a gate valve.

It is an advantage of the invention that the tempering result achieved is very even. Furthermore, space is saved as no separate tempering zone is needed even for thin glasses. This also lowers acquisition costs. A separate compressor is not needed either, but instead two moderately sized fans are sufficient to provide tempering air to the entire thickness area of the glass.

Figure 2:
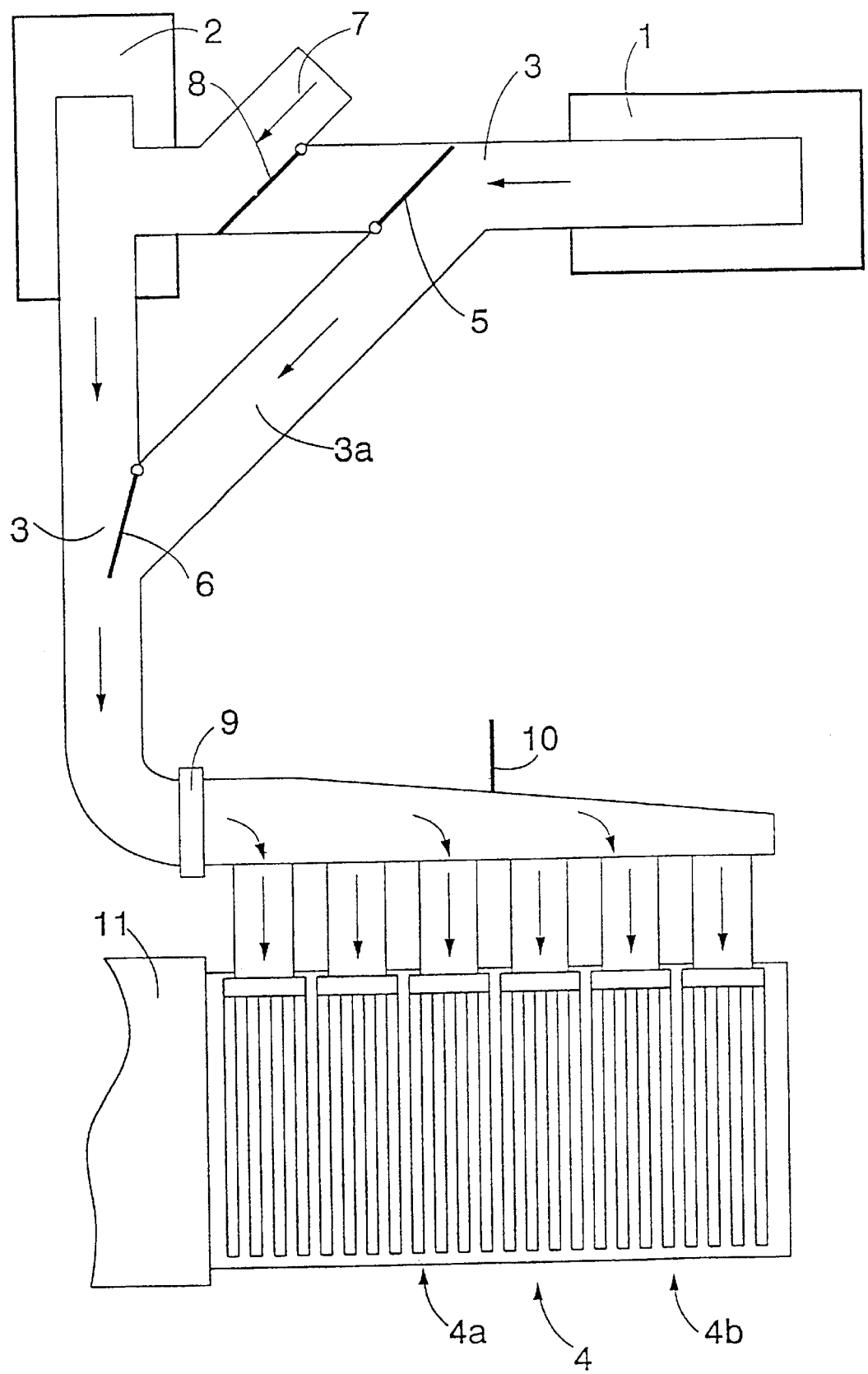
Figure 3:
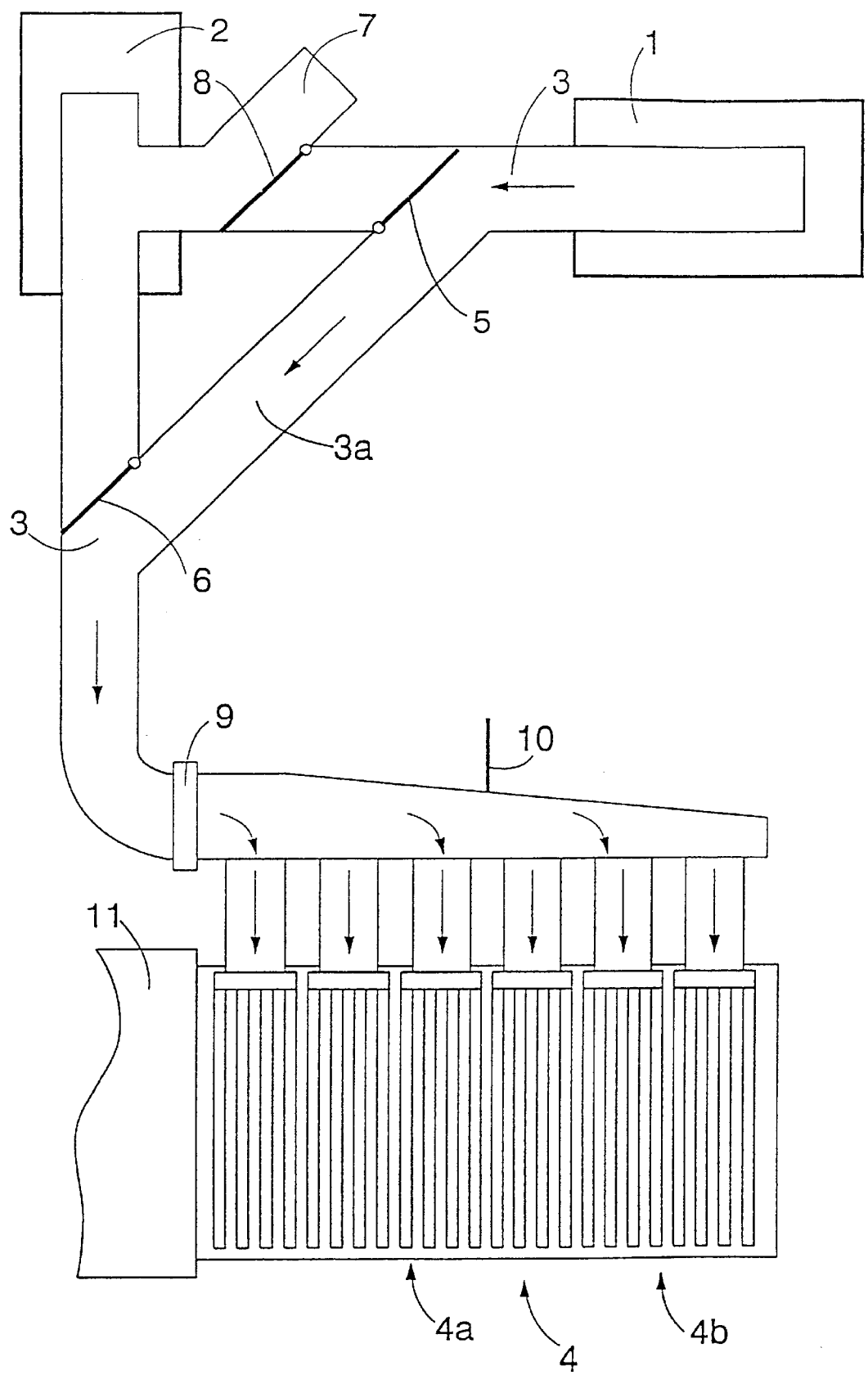
Figure 4:
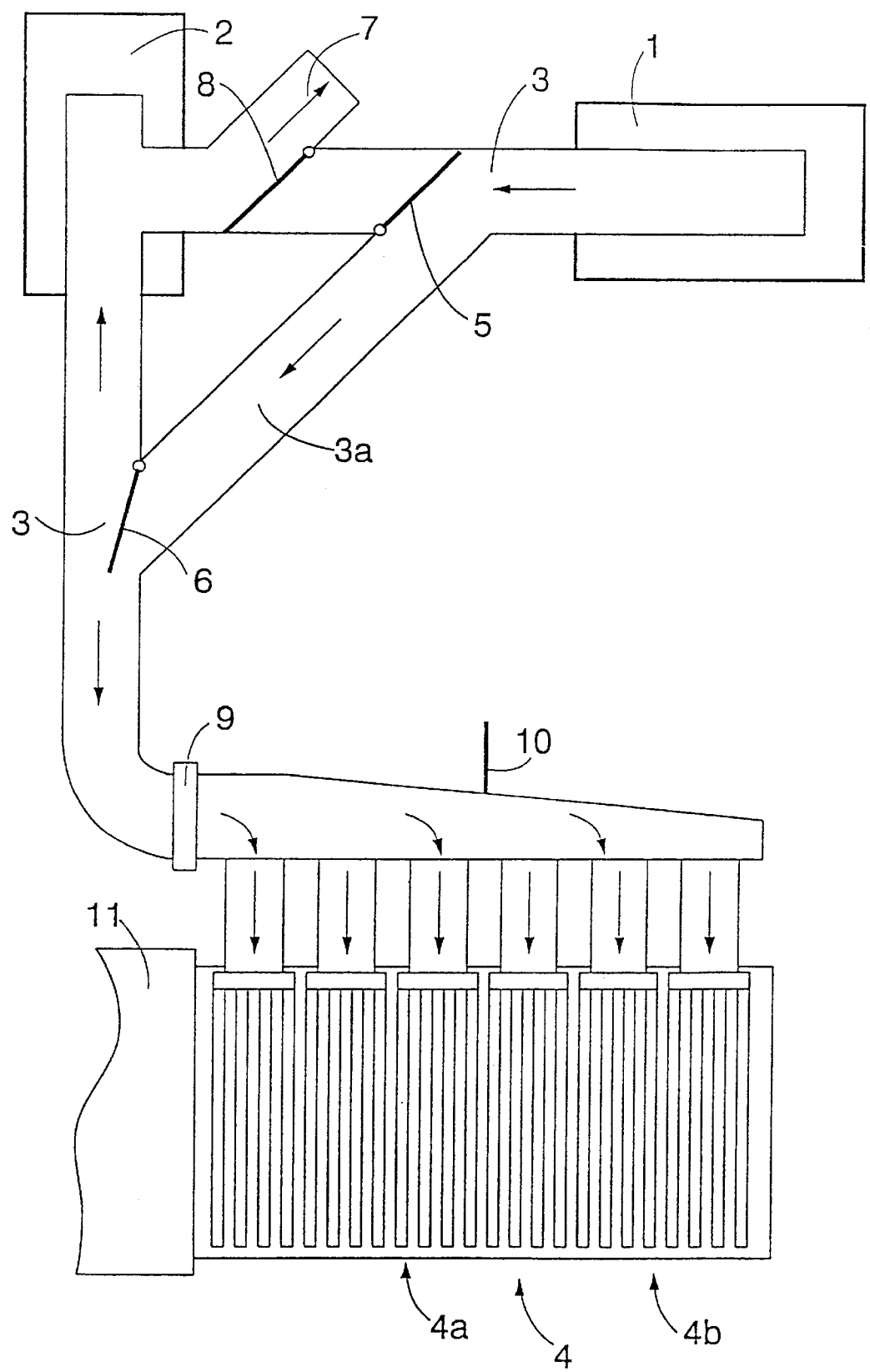

The invention will be described in more detail in the attached drawings in which FIG. 1 schematically shows an equipment according to the invention adapted for thin glasses, FIG. 2 shows the equipment of FIG. 1 adapted for medium-thin glasses, FIG. 3 shows the equipment of FIG. 1 adapted for medium-thick glasses, and FIG. 4 shows the equipment of FIG. 1 adapted for thick glasses.

FIG. 1 schematically shows a blast pressure unit according to the invention. The blast pressure unit comprises a first fan 1 and a second fan 2, connected by a channel system 3 for blast air at the tempering area 4. A by-pass channel 3a is further connected to the channel system 3, but is closed in the case of FIG. 1 by a first gate valve 5 of the bypass channel 3a and by a second gate valve 6 of the bypass channel 3a such that no air flows in the bypass channel 3a. Instead, the air originating from the first fan 1 is led to the second fan 2, from which the air is led further, i.e. the first fan 1 and the second fan 2 are coupled in series. A suction port 7 in the second fan 2 is closed by a gate valve 8 in the suction port 7. The travel of air to tempering nozzles disposed above and below the glass is controlled by a regulating device 9 which uses throttle control to adjust the desired tempering pressure on the upper and lower sides. A closing device 10 is in its closed position, the tempering blast being led only to the end of the tempering area 4 facing the tempering furnace 11, i.e. the first part 4a of the tempering area 4. The latter part 4b of the tempering area 4 becomes thus depressurized and a maximum tempering pressure of about 20 to 25 kPa, for example, is reached in the first part 4a. In FIG. 1, the airflow is illustrated by arrows.

After the tempering furnace, thin glasses, in this context glasses with a thickness of 2.8 to 3.8 mm, are led through the first part 4a of the tempering area 4 operating as the tempering zone, the blast pressure unit being adapted in accordance with FIG. 1. The area of the tempering zone is preferably about one half, i.e. 35 to 65%, of the area of the tempering area 4. When the glasses have passed across the pressurized first part 4a, the closing device 10 is opened, whereby the entire tempering area 4 is subjected to blowing. In addition, it is possible, particularly when full-length loads are concerned, to transport the glasses to an auxiliary conveyer disposed between a chiller and a loading table, from where they return to the blowing zone. Naturally this blowing is significantly less pressurized than the blowing directed at the first part 4a in the case shown in FIG. 1. The glass load is oscillated over the entire length of the tempering area 4, and it is possible to aftercool thin glasses to processing temperature, although then they are not subjected to so high a pressure as at the tempering stage.

FIG. 2 shows the equipment of FIG. 1 adapted for medium-thin glasses. The numbering of FIG. 2 corresponds to that of FIG. 1. In this context, medium-thin glasses refer to glasses with a thickness of 3.8 to 4.8 mm. The first gate valve 5 of the bypass channel 3a has been turned such that the airflow of the first fan 1 is led to the bypass channel 3a. Similarly, the gate valve 8 of the suction port 7 is opened such that air is led from the suction port 7 to the second fan 2. Further, the second gate valve 6 of the bypass channel 3a is adapted such that both the airflow of the second fan 2 and the airflow of the first fan 1 via the bypass channel 3a can be led to the tempering area 4. The second gate valve 6 of the bypass channel 3a is in a centre position in equilibrium, whereby an equal amount of air at the same pressure can be taken from both fans. The gate valve 6 also operates as a pressure balancer for the fans by adjusting the size of the inlet such that, when needed, it throttles one channel in case balance is lost. A tempering blast has been led to the entire tempering area 4 from the starting moment, i.e. the closing device 10 is open all the time. Typically, the need for tempering pressure is about 7 to 10 kPa. Thus the first fan 1 and the second fan 2 operate connected in parallel, and the air blown by them is fed to the entire tempering area 4.

FIG. 3 shows the blast pressure unit of the invention adapted for medium-thick glasses. The numbering of FIG. 3 corresponds to that of FIGS. 1 and 2. In this context, medium-thick glasses refer to glasses with a thickness of 4.8 to 10 mm. The second fan 2 is switched off and the blast air of the first fan 1 is adapted to pass along the bypass channel 3a by means of the first gate valve 5 and the second gate valve 6 of the bypass channel 3a to the tempering area 4. The closing device 10 is open, whereby the blast is directed at the entire tempering area 4. The need for tempering pressure is in the range 3 to 5 kPa. The pressure level is adjusted by the guide vane control of the fan. The second fan 2 may also be used for blowing, whereby the first fan 1 is switched off and the bypass channel 3a is closed by the gate valves 5 and 6 of the bypass channel 3a. This way the fans can be used equally, whereby the bearings or other mechanics of either fan do not wear essentially more rapidly that that of the other, and the blast pressure unit remains in working order longer than if only one of the fans were used.

FIG. 4 shows the blast pressure unit of the invention adapted for tempering thick glasses. The numbering of FIG. 4 corresponds to that of FIGS. 1 to 3. In this context, thick glasses refer to glasses with a thickness of 10 to 19 mm. Particularly when very thick glasses, i.e. thickness 15 to 19 mm, are concerned, the tempering pressure must be very low, e.g. 50 to 100 Pa. In the case shown in FIG. 4, the second fan 2 is switched off and only the first fan 1 is working with its guide vane control closed. The blast air of the first fan 1 is led to the bypass channel 3a by the first gate valve 5 of the bypass channel 3a. The second throttle 6 of the bypass channel 3a is in an intermediate position, whereby the air coming from the bypass channel 3a is allowed to flow through the second fan 2 and further out of the suction port 7. The tempering pressure can be adjusted by means of the positions of the gate valves 6 and 8, and, when needed, also by means of the guide vane control of the first fan 1. It is also possible for a part of the air produced by the first fan 1 to be led out of the system directly via the gate valves 5 and 8, whereby the tempering pressure is adjusted by means of the positions of these two gate valves.

In the blast pressure unit according to the invention, one of the fans, for example, may be a so-called two-speed fan, whereby a low tempering pressure is achieved by using the lower speed of rotation of the blast engine, and adjust the pressure level by means of the guide vane control of said fan. Furthermore, the speed of rotation of the fan may be adjusted e.g. by means of inverter drive.

The drawing and the related description are only intended to illustrate the idea of the invention. As to its details, the invention may vary within the scope of the claims. The glass thickness values presented in the description serve only as examples, and, according to the need, each presented embodiment of the equipment may naturally be used with another glass thickness than that presented, depending on the fan dimensioning, for example.

What is claimed is:

1. A method of adjusting the cooling air of a glass tempering machine, in which method cooling air is led to a tempering area for cooling the glass exiting a tempering furnace, wherein tempering area is reduced by closing a closing device that can be opened and closed, whereby a tempering zone with a pressure that can be raised sufficiently high for tempering thin glass can be formed out of the reduced tempering area and that the glass is led through the tempering zone, after which the closing device, is opened and the glass is oscillated within the entire tempering area, the tempering area serving as an aftercooling unit.

2. A method as claimed in claim 1, wherein the area of the tempering zone formed out of the tempering area is 35 to 65% of the area of the tempering area.

3. A method as claimed in claim 1, wherein the cooling air is provided by at least two fans, connected either in series or in parallel, depending on the thickness of the glass.

4. An equipment for adjusting the cooling air of a glass tempering machine, the equipment comprising at least one fan and a channel system for leading cooling air to a tempering area for cooling the glass exiting a tempering furnace, wherein the equipment comprises a closing device for directing blast air at only a part of the tempering area, whereby a tempering zone with a pressure that can be raised sufficiently high for tempering thin glass is formed out of the reduced tempering area, means for leading the glass through the tempering zone, controlling means for opening the closing device after the glass is led through the tempering zone and means for oscillating the glass within the entire tempering area, the tempering area serving as an aftercooling unit.

5. An equipment as claimed in claim 4, wherein the closing device is adapted such that the area of the tempering zone is 35 to 65% of the area of the tempering area.

6. An equipment as claimed in claim 4, wherein the equipment comprises at least two fans, a bypass channel and gate valves such that the fans can be connected both in series and in parallel.

7. A method as claimed in claim 2, wherein cooling air is provided by at least two fans, connected either in series or in parallel, depending on the thickness of the glass.

8. An equipment as claimed in claim 5, wherein the equipment comprises at least two fans, a bypass channel and gate valves such that the fans can be connected both in series and in parallel.

* * * * *